July 26, 1960 J. F. ZIEVERS ET AL 2,946,444
APPARATUS FOR CONTINUOUS FILTERING
Filed Sept. 16, 1955 4 Sheets-Sheet 1
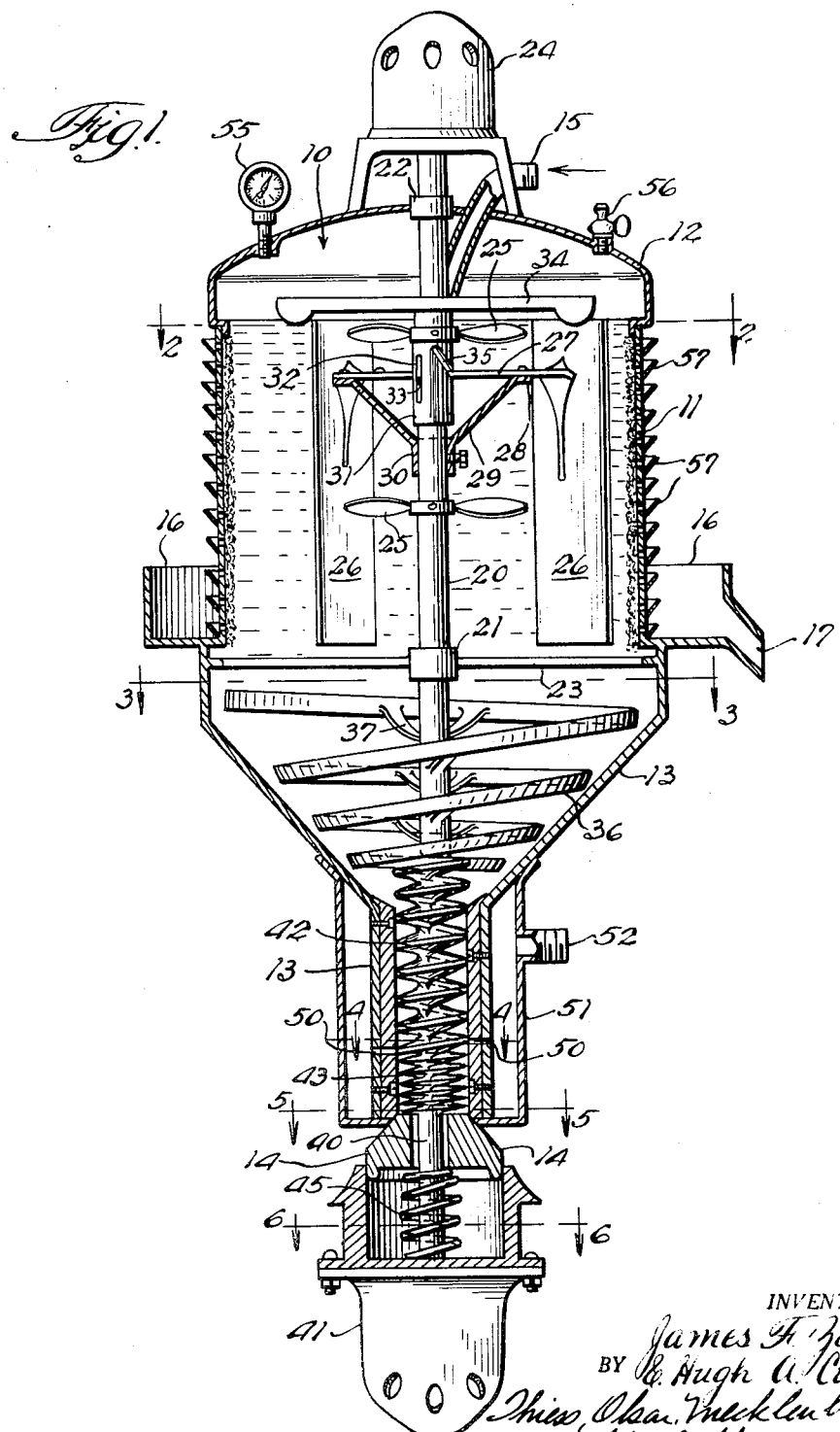
INVENTORS
James F. Zievers
BY Hugh A. Currie
Thiess, Olson, Mecklenburger,
von Holst, + Coltman.

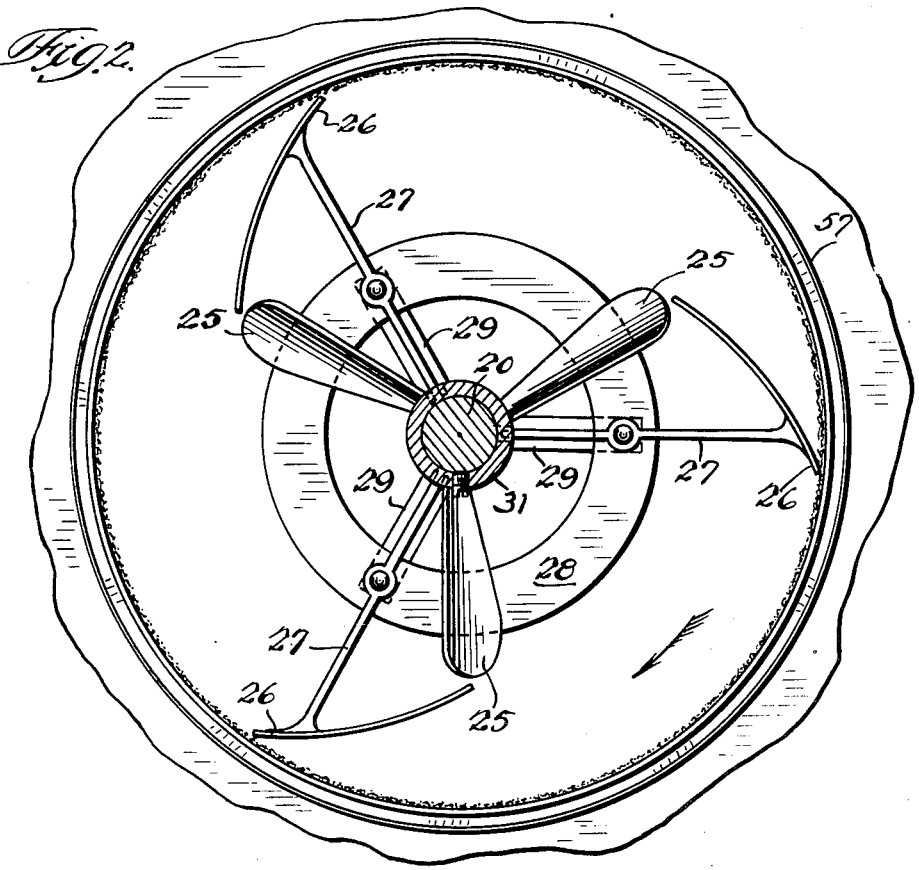
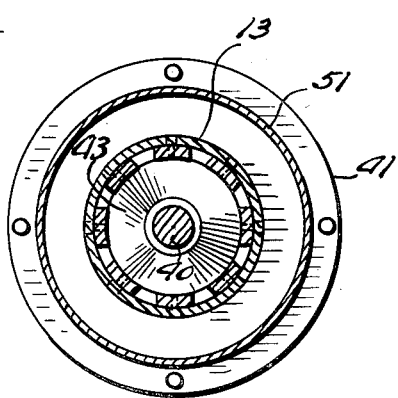

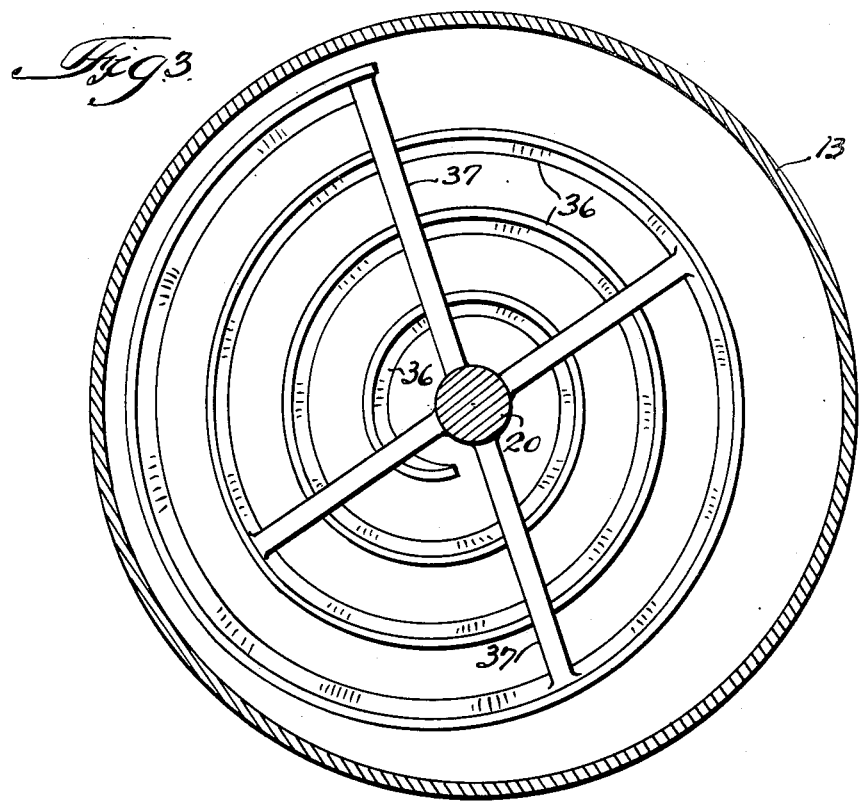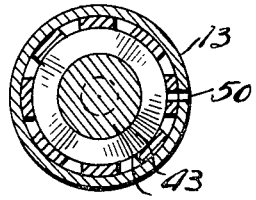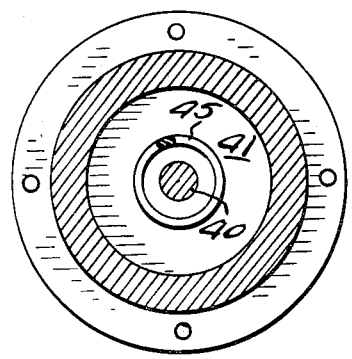

July 26, 1960    J. F. ZIEVERS ET AL    2,946,444
APPARATUS FOR CONTINUOUS FILTERING
Filed Sept. 16, 1955    4 Sheets-Sheet 4

Fig. 7.

INVENTORS.
James F. Zievers &
BY Hugh A. Currie
Olson, Mecklenburger, van Holst,
Pendleton & Neuman.

United States Patent Office 2,946,444
Patented July 26, 1960

2,946,444

APPARATUS FOR CONTINUOUS FILTERING

James F. Zievers, Skokie, Ill., and Hugh A. Currie, San Jose, Calif.; said Currie assignor to said Zievers Filed Sept. 16, 1955, Ser. No. 534,779

9 Claims. (Cl. 210—107)

This invention relates to an apparatus for filtering liquids continuously, and it is an object of the invention to provide an improved apparatus of that character.

In many filter applications, whether industrial, municipal or domestic, it is desirable that the filter operate continuously. Such a filter should be capable of receiving a continuous flow of liquid to be filtered and to expel a continuous flow of filtered liquid without interruption of service for cleaning or replacing the actual filtering element. It is another object of the invention to provide improved filter apparatus of that character.

In many filter applications, it is desirable that such continuous filter apparatus remove all or substantially all of the liquid from the ejected solids and to eject the accumulated solids continuously. It is another object of the invention to provide an improved apparatus for filtering having this characteristic.

It is another object of the invention to provide improved filter apparatus which can receive a continuous flow of liquid to be filtered, eject a continuous flow of filtered liquid, continuously remove accumulated solids from the filter element itself, and continuously eject very dry accumulated solids.

It is another object of the invention to provide an improved apparatus for continuous filtering in which filtered solids are permitted to accumulate to a desired thickness on the filter element itself whereby the deposited cake of solids may act as a filter.

It is still another object of the invention to provide an improved apparatus for continuous filtering having various of the characteristics indicated above while being efficient, reliable, and economical to manufacture.

This invention, together with further objects and advantages thereof, will best be understood by reference to the following description taken in connection with the accompanying drawings, and its scope will be pointed out in the appended claims.

In the drawings, in which like parts are designated by like reference numbers,

Figure 1 is a sectional elevation of continuous filter apparatus illustrating one embodiment of the invention;

Fig. 2 is a cross-sectional view of the same apparatus taken along the line 2—2 of Fig. 1;

Fig. 3 is a cross-sectional view of the same apparatus taken along the line 3—3 of Fig. 1;

Fig. 4 is a cross-sectional view of the same apparatus taken along the line 4—4 of Fig. 1;

Fig. 5 is a cross-sectional view of the same apparatus taken along the line 5—5 of Fig. 1;

Fig. 6 is a cross-sectional view of the same apparatus taken along the line 6—6 of Fig. 1; and Fig. 7 is a fragmentary sectional elevation showing a modified closure for the apparatus of the invention and also showing modified control means for operating the scraper blades of the invention.

Filter apparatus constructed in accordance with the present invention is well adapted to various industrial and municipal applications and may, furthermore, be of practical use in domestic applications. Among the uses for which it is recommended are the removal of lime from liquid sugar concentration and the filtration of various other sugar concentrations in both the beet and cane sugar industries. It is also recommended for the removal of crushed seed bits from vegetable oils. Still further, it is recommended for filtration of various chemical liquids and for the filtration of sewage. It is to be understood that the above suggested applications are merely illustrative and in no sense encompass the many practical applications of the invention.

In accordance with the illustrated embodiment of the invention, a generally cylindrical chamber 10 is provided. The cylindrical walls of this chamber comprise the actual filter element 11 which may consist of perforated sheet metal, a metal screen or any other filter means, organic or inorganic, suitable for use in the application in which the apparatus is employed. The filter element 11 as illustrated is perforated sheet metal having apertures on the order of .030 inch in diameter. The size of opening is believed to be standard in the filtering of sugar concentrations. The size of opening is, of course, to be selected in accordance with the use to which the filter apparatus is put. The application of the filter apparatus should also be taken into consideration in the selection of the material of which the filter element 11, along with the other parts of the apparatus, are made.

Arranged above the filter element 11 and secured thereto is a head 12 which closes the upper end of the generally cylindrical chamber 10. Below the filter element 11 and secured thereto is a generally conical or funnel-shaped member 13 which, in cooperation with a plug 14 at the lower end thereof, closes the bottom end of the generally cylindrical chamber 10.

An inlet 15 extending through the head 12 is provided for feeding liquid to be filtered into the chamber 10 under pressure. The general flow of liquid is through the inlet pipe 15 to the interior of the chamber 10, and through the filter element 11. After the liquid has passed through the filter element 11, it is collected by a trough 16 and runs out through a spout 17.

Arranged within the chamber 10 is a shaft 20 mounted in bearings 21 and 22. The upper bearing 22 is mounted in the head 12 while the lower bearing 21 is supported by arms 23 which are in turn secured to the conical member 13. At the top of the apparatus is a suitable motor 24 for causing rotation of the shaft 20. Arranged on the shaft 20 are a pair of propellers 25 which direct the liquid downwardly. This serves to facilitate settling of solids in the bottom of the chamber.

Also mounted on the shaft 20 are three doctor blades 26. These doctor blades are adjustable radially of the generally cylindrical chamber 10 with respect to the shaft 20. More specifically, each blade 26 is carried by an arm 27 which is pivotally supported on a ring 28. The latter in turn is rigidly supported by a plurality of arms 29 which converge to form a hub 30, the hub being secured to the shaft 20.

A sleeve 31 is slidably mounted on the shaft 20 immediately above the hub 30. Rotation of this sleeve with respect to the shaft 20 is prevented by a slot 32 in the sleeve and a pin 33 which is set in the shaft 20 and extends into the slot 32. A float 34 is rigidly connected to the upper end of the sleeve 31 to the effect that as the liquid level in the chamber 10 rises and falls, the float 34 raises and lowers the sleeve 31.

The inner ends of the blade-supporting arms 27 extend into helical slots 35 in the sleeve 31. It will accordingly be seen that as the float 34 and sleeve 31 are raised and lowered by rising and falling liquid level, the blade-supporting arms 27 are pivoted such that the active edges of the blades are moved toward and away from the inner surface of the filter element 11. Reference to Figs. 1 and 2 reveals that as the float 34 and the sleeve 31 rise, the cutting edges of the blades move closer to the filter element 11.

In the case of filtering lime from sugar concentrations and in various other filter applications, it has been found that the solids extracted from the liquid form the best filtering agent. In the case of sugar concentration filtering specifically, the filter element 11 is not, and need not, be a very effective filtering element. In practice, the filter is operated for a short time with the outgoing liquid being returned to the inlet until such time as a cake of lime is built up on the inner surface of the filter element. After this cake has developed, it serves as a filter which is mechanically supported by the filter element 11. The purpose of the doctor blades 26 is to remove excess cake so that the thickness thereof is maintained at a reasonable value. The adjustable mounting of the doctor blades, as controlled by the float 34 and the sleeve 31, serves to cut the residual cake thinner when the pressure, and hence the liquid level, rises in the chamber 10. Conversely, when the pressure, and hence the liquid level, in the chamber drops, the cutting edges of the blades are moved radially inward to permit the building up of a thicker cake.

It will also be noted in Fig. 2 that the upper propeller blades 25 trail the doctor blades whereby maximum downward movement of the liquid within the chamber 10 carries the loosened cake downwardly.

Also designed to facilitate settling of solid matter is a spiral helix 36 which is mounted on the lower end of the shaft 20 by a plurality of arms 37. This spiral helix turns in such a direction as to cause a downward flow of liquid adjacent the inner surface of the conical or funnel-shaped member 13.

In the lower end of the funnel-shaped member 13 is a second shaft 40 driven by a motor 41. The frame of the motor 41 is rigidly connected to the funnel-shaped member 13, although such connections have been omitted in the drawings in the interest of clarity. A coarse screw 42 is secured to the upper end of the shaft 40 and fits snugly within the lower portion of the funnel-shaped member 13. It will be apparent that as the motor 41 and the shaft 40 rotate the screw 42 in the proper direction, solid material which falls between the screw and the surrounding wall will be forced downwardly.

Located below the coarse screw 42 is a finer screw 43 which preferably has a graduated pitch, the pitch becoming smaller toward the bottom thereof. The solid matter, already compressed by the screw 42, is further compressed by the finer screw 43 and still further compressed by the graduated pitch of the latter screw. As a result of this increasing compression of the solid matter, a very large percentage of the water originally accompanying the solid matter is pressed out and forced upwardly back into the chamber 10.

Immediately below the fine screw 43 is a plug 14 which is backed up by a spring 45. When solid matter is moved downwardly with sufficient force by the screw 43, it forces the plug 14 downwardly against the action of the spring 45 whereupon the solid matter is ejected through the resulting annular opening between the plug 14 and the bottom of the funnel-shaped member 13.

At the top of the coarse screw 42 an axial recess is preferably provided for receiving the lowermost end portion of the upper shaft 20. This serves to make both shafts, and particularly the lower end of the shaft 20, more steady.

Where the liquid normally accompanying the ejected solid matter is of substantial value as in sugar concentrations it is desirable not only to squeeze as much moisture as possible out of the solid matter before ejecting it, but it is also desirable to leach the pressed solid matter with clear or filtered liquid. For this purpose, ports 50 are provided in the walls of the funnel-shaped member 13 intermediate the two screws 42 and 43. To facilitate the admission of liquid to and through the ports 50, a jacket 51 having an inlet opening 52 is provided around the lower portion of the funnel-shaped member 13, as illustrated in Fig. 1. Either a clear liquid or previously filtered liquid may be supplied to the inlet 52 under pressure. This liquid passes through the ports 50 and necessarily is forced upwardly through the solid matter caught in the coarse screw 42. This clear or filtered liquid leaches out the rich liquid entrained in the solid matter and replaces it with a thinner or clear liquid. This process is sometimes referred to in the art as "sweetening off."

The various elements of the illustrated embodiment of the invention now having been described, the machine may better be understood following a description of the operation of the machine.

The liquid to be filtered is fed into the generally cylindrical chamber 10 through the inlet pipe 15. During the initial operation, this liquid may flow relatively freely through the filter element 11 until such time as a cake of deposited solids builds up on the interior of the filter element. Until such time as this cake is built up, the liquid which passes through the filter element may carry with it substantial quantities of the solids which it is desired ultimately to remove from the liquid. In such case, the liquid which has passed through the filter is fed back into the supply of unfiltered liquid until such time as the necessary or desired thickness of cake is built up.

After the desired thickness of cake has accumulated, the liquid which passes through the cake and through the filter element 11 will be substantially free of the undesired solids. The filter is then in effective operation and the liquids coming from the spout 17 can be diverted to the desired use.

With the motor 24 in operation, the shaft 20 rotates and carries with it the propellers 25 and the scraper blades 26. As long as the level of the liquid within the chamber 10 is at a minimum, the float 34 rides at its lowermost point and the blades 26, as controlled by the sleeve 31, are pivoted away from the filter element 11. When solids have been deposited on the filter element 11 to such a thickness that the flow of liquid therethrough is restricted more than is desired, the liquid level in the chamber 10 will rise and lift the float 34 and hence the sleeve 31. This pivots the arms 27 as they ride in the slots 35, with the result that the scraping edges of the blades 26 are swung closer to the filter element 11. The blades then scrape off a quantity of the deposited cake and reduce the restriction to the flow of liquid. It is intended that the liquid level will remain close to an optimum value, such that the float 34 causes the blades 26 to scrape lightly against the deposited solids and maintain an optimum thickness of cake.

The cake which is scraped off by the blades 26 along with the solids carried in by the incoming liquid are forced downwardly by the propellers 25 such that they tend to settle in the funnel-shaped member 13. The spiral helix 36 encourages further downward movement of all solids such that they are trapped by the rotating screw 42 and squeezed downwardly. The solids are subsequently caught by the finer screw 43. This screw preferably has a graduated pitch, becoming finer near its lower end. This causes still further compression and wringing out of the entrapped solids. The relatively dry solids are finally forced past the spring-backed plug 14 and are ejected.

If desired, the solids trapped by the screw 42 may be sweetened off by forcing clear or filtered liquid through the ports 50 and upwardly past the solids.

If desired, radial adjustment of the scraping edges of the blades 26 may, of course, be controlled electrically rather than mechanically. A pressure gauge 55 may, for example, have electrical contacts arranged thereon which are operated by the rise or fall of the pressure within the chamber 10 above or below a given value or values. In Fig. 7 there is diagrammatically shown a simple electrical circuit and mechanical linkage arrangement for effecting movement of the sleeve 31 up and down in accordance with the pressure variations in the chamber 10. For this purpose a flange 201 forming part of sleeve 31 is adapted to be engaged for movement by a lever mechanism which, in turn, is adapted to be operated by a simple coil or solenoid circuit energized by means of contacts provided on the pressure gauge 55. Thus a lever 202 pivoted at its center is provided with a yoke portion 203 at one end for engaging the flange or collar 201 and is linked at its other end to a rod 204 which passes through the wall of chamber 10, as shown, and is adapted for actuation by the coils 205 and 206. An appropriate seal 207, of course, is provided for the rod where it passes through the chamber wall.

The coil 205 may be energized through conductors 208, 209 and 210 from a source "S" through contacts 211 when these contacts are closed by the instrument pointer 55a. Similarly, the coil 206 may be energized through conductors 210, 212 and 209 from source "S" through contacts 213 when these contacts are closed by the instrument pointer 55a.

When the pressure in chamber 10 rises to its predetermined upper limit, the pointer 55a will engage contacts 213. This closes the circuit described to coil 206 which upon energization causes the rod 204 to move downwardly, thereby raising the flange 201 and sleeve 31. It is assumed that the sleeve 31 and flange 201 are in a lower position from a previous operation. Consequently, the blades 26 are moved outwardly to scrape off the material accumulated on the chamber wall. Thereafter, as the pressure inside of the chamber 10 decreases, the pointer 55a will move away from contacts 213, thereby opening the energizing circuit for coil 206. However, the rod 204 remains in its position until the pressure in chamber 10 drops to its predetermined lower value at which pointer 55a engages contacts 211. This engagement energizes coil 205 through the circuit previously described and causes the rod 204 to move upwardly, thereby moving the flange 201 and sleeve 31 downwardly which in turn moves the blades 26 radially inwardly until the process described repeats itself. It should be noted, however, that whether the blades 26 are positioned mechanically or electrically the blades are, in fact, positioned in accordance with the pressure in the chamber 10. The float 34 responds directly to the level of the liquid in the chamber 10. However, the level of the liquid is a function of the pressure in the chamber. Accordingly, the float 34 and hence the blades 26 are controlled in accordance with the chamber pressure. The level of the liquid within the chamber for a given pressure is a function of the amount of air trapped in the cover 12. This latter factor may be regulated, if desired, by momentarily opening a suitable air vent 56 to admit air under pressure or to vent the chamber.

It has now been shown that the illustrated embodiment of the invention permits continuous filtering operation without the necessity of interrupting operation to clean or replace the filter element. Various features have been shown for facilitating the settling of solids. Means have been illustrated and described whereby the solid matter is continuously ejected in a relatively dry state. Still further means have been illustrated and described for "sweetening off" about-to-be-ejected solid matter, whereby the residual liquid entrained in the solid matter is leached and diluted by clear or filtered liquid.

Two separate motors 24 and 41 are shown for the scrapers 26 and screws 42 and 43, respectively. This arrangement is preferred to a single motor, since under certain circumstances it may be desired that the scraper blades and the ejector screws be operated at various speed ratios. For example, if the ratio of solids to liquid as fed to the filter apparatus is high, and particularly if the solids have a considerable tendency to settle to the bottom of the container without ever being deposited on the filter element, it may be desired that higher speed than normal, whereas the blades 26 may the motor 41 driving the ejector screws operate at a operate at normal speed. On the other hand, if the solids being deposited on the interior surface of the filter elements are of such character that the thickness of the accumulated cake is critical, then it may be necessary to operate the blades at relatively high speed to keep the thickness of the cake within critical limits.

It will now be seen that a method of filtering has been disclosed which is believed to be more effective and more practical in many applications than any which has heretofore been known. After the stable operation has been established, the liquid to be filtered is fed through a cake of solids deposited on the upstream side of the filter element. This cake is maintained at an optimum thickness by scraping away the upstream surface of the cake. Furthermore, solids which settle to the bottom of the filter chamber are continuously extracted by screw means and may be sweetened off by the application of clear or filtered liquid under pressure intermediate the ends of the screw means.

If the filtering apparatus is to handle sewage, it is desirable that the filtered liquid be aerated before it is discharged into a stream or river in order to prevent the killing off of marine life as a result of an oxygen shortage. To this purpose a series of annular louvers or splash blades 57 may be secured to the outer surface of the filter element 11. These will cause cascading of the water as it falls from the filter into the trough 16.

In various applications of filter apparatus constructed in accordance with the present invention, it may be desirable to enclose the space surrounding the filter element 11. As shown in Fig. 7, a cylindrical enclosure 200 may be provided around the outside of the filter element 11. Such an enclosure may serve merely to prevent splashing of the effluent, in which case it may consist of a relatively fragile enclosure. On the other hand, if the enclosure is capable of withstanding significant pressure, it could be used effectively in occasional cleaning of the filter element. In such case, a valve might be employed to close the spout 17 such that a substantial pressure is built up in the outer enclosure. Incoming liquid through the inlet 15 could then be cut off and the vent 56 opened suddenly. This would cause a reverse flow through the filter element 11 from the outer enclosure into the filter chamber 10. By this expedient a very thorough cleaning of the filter element may result if the pressure within the chamber 10 is dropped suddenly.

In the embodiments of the invention disclosed in the drawings, a cover 12 is provided for the chamber 10 in order that substantial pressure may be built up within the chamber to force the liquid through filter element and through the cake deposited on the inner surface thereof. However, in some applications of the apparatus relatively little pressure may be required. In such case the cover 12 may be eliminated or the vent 56 allowed to remain open. In this case the pressure within the chamber 10 forcing the liquid through the filter element, would consist only of the liquid head within the chamber. Reference has been made herein to the insertion of the liquid to be filtered into the chamber 10 under pressure. The amount of pressure required may be great or small according to the application of the apparatus. The desired inlet pressure is of course that pressure which will maintain a suitable level of liquid within the chamber and produce the desired flow through the filter element. In some cases the required inlet pressure may be a matter of a few ounces per square inch which could be obtained from a slight head of liquid.

Various means other than those disclosed may be employed for controlling the scrapers 26. They might, for example, be controlled mechanically, electrically, or hydraulically, and the governing control might rspond to liquid level, pressure, or inlet flow.

While the particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. Continuous filter apparatus comprising a substantially sealed cylindrical chamber, the cylindrical walls thereof comprising a perforated filter element, an inlet for admitting liquid to be filtered into said chamber under pressure, a rotating scraper adjustable radially in said chamber for scraping accumulated solids from the interior of said filter element, a float arranged to float on the liquid in said chamber, and means interconnecting said float and said scraper and driving said scraper radially outward when said float rises.

2. Filter apparatus according to claim 1 wherein said interconnecting means comprises a vertical shaft disposed in said chamber, a first annular member secured to said shaft for rotation therewith, a radially extending horizontally disposed scraper-supporting arm pivotally connected to said first annular member between said scraper and said shaft, a second annular member connected to said float for vertical movement therewith and slidably mounted on said shaft for rotation therewith, said second annular member having an inclined slot in the periphery thereof for receiving therein the inner end of said scraper-supporting arm whereby upward movement of said second annular member and float on said shaft causes said scraper-supporting arm to pivot on said first annular member to move said scraper radially.

3. Continuous filter apparatus comprising a substantially sealed cylindrical chamber, the cylindrical walls thereof comprising a perforated filter element, an inlet for admitting liquid to be filtered into said chamber under pressure, a rotating scraper adjustable radially in said chamber for scraping accumulated solids from the interior of said filter element, a float arranged to float on the liquid in said chamber, and means interconnecting said float and said scraper for driving said scraper radially.

4. Filter apparatus according to claim 3 wherein said interconnecting means comprises a vertical shaft disposed in said chamber, a first annular member secured to said shaft for rotation therewith, a radially extending horizontally disposed scraper-supporting arm pivotally connected to said first annular member between said scraper and said shaft, a second annular member connected to said float for vertical movement therewith and slidably mounted on said shaft for rotation therewith, said second annular member having an inclined slot in the periphery thereof for receiving therein the inner end of said scraper-supporting arm whereby vertical movement of said second annular member and float on said shaft causes said scraper supporting arm to pivot on said first annular member to radially adjust the proximity of said scraper to said walls.

5. Continuous filter apparatus comprising a substantially sealed cylindrical chamber, the cylindrical walls thereof comprising a perforated filter element, an inlet for admitting liquid to be filtered into said chamber under pressure, a rotating scraper adjustable radially in said chamber for scraping accumulated solids from the interior of said filter element, and means responsive to changes in the liquid level within said chamber for driving said scraper radially, said responsive means driving said scraper radially outwardly when said liquid level rises and radially inwardly when said liquid level falls.

6. Continuous filter apparatus comprising a chamber having walls which comprise a perforated filter element, an inlet for admitting liquid to be filtered into said chamber, an adjustable scraper movable relative to the walls of said filter element for scraping accumulated solids from the upstream side of said filter element, and means responsive to changes in the liquid level within said chamber for adjusting the proximity of said scraper to said walls, said responsive means driving said scraper radially outwardly when said liquid level rises and radially inwardly when said liquid level falls.

7. Continuous filter apparatus comprising a chamber having walls which comprise a perforated filter element, an inlet for admitting liquid to be filtered into said chamber, an adjustable scraper movable relative to the walls of said filter element for scraping accumulated solids from the upstream side of said filter element, and means responsive to changes in the liquid level within said chamber for adjusting the proximity of said scraper to said walls, said responsive means comprising a float arranged to float on the liquid in said chamber, and means interconnecting said float and said scraper for making said adjustment.

8. Continuous filtering apparatus comprising a chamber having cylindrical walls which comprise a perforated filter element, an inlet for admitting liquid to be filtered into said chamber under pressure a rotating scraper adjustable radially in said chamber for scraping accumulated solids from the interior of said filter element, said scraper having a radially outward leading portion for engaging said solids and a radially inward trailing portion for stirring said liquid and urging said scraped solids radially inwardly, a rotating propeller having a radially extending blade terminating proximate to the inward surface of the said trailing portion, said blade being pitched to urge downwardly said liquid including solids therein contained which have been scraped from said filter element, and means responsive to changes in the liquid level within said chamber for adjusting the proximity of the leading edge of said scraper to said filter element.

9. Continuous filter apparatus comprising a substantially sealed cylindrical pressure chamber, the cylindrical wall thereof comprising a filter element, an inlet for admitting liquid to be filtered into said chamber under pressure, the top of said chamber comprising a closure for air entrapped under pressure above the level of said liquid on the upstream side of said filter element, a rotating scraper adjustable radially in said chamber for scraping accumulated solids from the interior of said filter element, and means responsive to changes in the pressure of said air for driving said scraper radially, said responsive means driving said scraper radially outwardly when said pressure increases to one predetermined value and radially inwardly when said pressure decreases to another predetermined value.

References Cited in the file of this patent

UNITED STATES PATENTS

| | | |
|---|---|---|
| 239,222 | Burgess | Mar. 22, 1881 |
| 336,425 | Ockershausen | Feb. 16, 1886 |
| 521,591 | Lynn | June 19, 1894 |
| 721,890 | Henius | Mar. 3, 1903 |
| 1,053,172 | Hendryx | Feb. 18, 1913 |
| 1,224,213 | Rosenthal | May 1, 1917 |
| 1,443,918 | King | Jan. 30, 1923 |
| 1,554,943 | Antoine | Sept. 22, 1925 |
| 1,702,192 | Blomfield | Feb. 12, 1929 |
| 1,772,262 | Naugle | Aug. 5, 1930 |
| 2,553,567 | Fette | May 22, 1951 |
| 2,805,773 | Mechlin | Sept. 10, 1957 |

FOREIGN PATENTS

| | | |
|---|---|---|
| 135,825 | Germany | Dec. 1, 1902 |

UNITED STATES PATENT OFFICE

CERTIFICATE OF CORRECTION

Patent No. 2,946,444                           July 26, 1960

James F. Zievers et al.

It is hereby certified that error appears in the printed specification of the above numbered patent requiring correction and that the said Letters Patent should read as corrected below.

Column 2, line 20, for "inch" read -- inches --; column 6, line 8, strike out "the motor 41 driving the ejector screws operate at a" and insert the same after "that" in line 6, same column; line 11, for "elements" read -- element --; line 18, strike out "the"; column 7, line 6, for "rspond" read -- respond --.

Signed and sealed this 4th day of April 1961.

(SEAL)
Attest:    ERNEST W. SWIDER

XXXXXXXXX
Attesting Officer

ARTHUR W. CROCKER
Acting Commissioner of Patents